(12) United States Patent
Peng et al.

(10) Patent No.: US 7,367,707 B2
(45) Date of Patent: May 6, 2008

(54) BACKLIGHT MODULE

(75) Inventors: Kuo-Chiang Peng, Taoyuan County (TW); Cheng-Min Liao, Taoyuan County (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 160 days.

(21) Appl. No.: 11/306,102

(22) Filed: Dec. 16, 2005

(65) Prior Publication Data

US 2007/0139964 A1    Jun. 21, 2007

(51) Int. Cl.
    *F21V 7/04* (2006.01)
(52) U.S. Cl. ..................................... 362/633
(58) Field of Classification Search ............... 362/633; 349/65
    See application file for complete search history.

(56) References Cited

U.S. PATENT DOCUMENTS 5,450,292 A * 9/1995 Yokoyama et al. ......... 362/613
6,108,060 A * 8/2000 Funamoto et al. ............ 349/65
6,386,722 B2 * 5/2002 Okumura .................... 362/633

* cited by examiner

*Primary Examiner*—Sandra O'Shea
*Assistant Examiner*—James W Cranson
(74) *Attorney, Agent, or Firm*—Jiang Chyun IP Office

(57) ABSTRACT

A backlight module comprising a light guild plate, at least one lamp, a lower frame, at least one turning holder, a locating block and an upper frame is provided. The lower frame is used for carrying the light guild plate and the lamp. The light guide plate has light incidence planes and light emergence planes, and the lamp is disposed beside at least a part of the light incidence planes. The lamp has at least one turning angle, and the turning holder covers the turning angle of the lamp. The locating block is disposed on the turning holder, and the upper frame is disposed on the lower frame and exposes the light emergence plane. The upper frame has a locating opening, and the locating block is embedded in the locating opening. The backlight module provides three-dimensional preservation to preserve the lamp from the damage caused by external impact.

13 Claims, 7 Drawing Sheets

BACKLIGHT MODULE

BACKGROUND OF THE INVENTION

1. Field of the Invention

The present invention generally relates to a backlight module. More particularly, the present invention relates to a backlight module which can preserve the lamp thereof from external impact and loading.

2. Description of Related Art

The liquid crystal display (LCD) comprises a liquid crystal panel and a back light module. Since the liquid crystals inside the panel are incapable of emitting any light, the liquid crystal panel must be illuminated from below by a planar light source such as the one produced by the back light module. Hence, the back light module is an important component in any liquid crystal display. The back light module can be further categorized into a direct-type back light module and a side-type back light module according to the position of the light source. Due to the requirement of the brightness, an L-shaped lamp is adopted as the light source of the side-type back light module recently.

FIG. 1A is a partially perspective view illustrating a conventional backlight module, and FIG. 1B schematically illustrates a sectional view of the conventional backlight module along line I-I' after assembled. Referring to FIGS. 1A and 1B, the backlight 100 comprises a light guide plate 110, an L-shaped lamp 120, a lower frame 150 and an upper frame 160. The light guide plate 110 has a light incidence plane 112, a light diffusion plane 114 and a light emergence plane 116. The L-shaped lamp 120 is disposed beside the light incidence plane 112 to provide light into the light guide plate 110 via the light incidence plane 112. The light can be diffused and reflected by the light diffusion plane 114 and then emerges from the light emergence plane 116. Accordingly, the light guide plate 110 transforms the linear light source into a uniform planar light source for a liquid crystal panel (not shown in drawings).

In addition, the lower frame 150 is used for carrying the light guide plate 110 and the L-shaped lamp 120. The upper frame 160 is fixed on the lower frame 150, and the upper frame 160 exposes the light emergence plane 116 of the light guide plate 110. Thus, the planar light source from the light emergence plane 116 can arrive the liquid crystal panel (not shown in drawings) disposed above the upper frame 160.

Referring to FIG. 1A, holders 122, 124, and 126 are adopted to cover the turning angle, the high voltage end and the low voltage end of the L-shaped lamp 120 to locate the L-shaped lamp 120 on an appropriate position. Nevertheless, the holder 122 may shift and expose the turning angle as moving the backlight module 100, and thus external impact or loading may damage the turning angle of the backlight module 100.

Besides, even though the holders 122, 124 and 126 cover the L-shaped lamp 120 exactly, that can prevent the L-shaped lamp 120 from only the impact and loading on the x-y plane but not the loading of the liquid crystal panel along z-axis. In other words, the weight of the liquid crystal panel causes impact or pressure to the L-shaped lamp 120 along z-axis in the assembling process of the liquid crystal panel and the backlight module 100 may lead to the damage of the L-shaped lamp 120. Therefore, means for preserving the lamp of the backlight from the external force has been an important issue in this field.

SUMMARY OF THE INVENTION

Accordingly, the purpose of the present invention is to providing a backlight module, which provides three-dimensional preservation for the lamp to prevent the lamp from the damage caused by external impact.

The present invention provides a backlight module comprising a light guild plate, at least one lamp, a lower frame, at least one turning holder, a locating block and an upper frame. The lower frame is used for carrying the light guild plate and the lamp. The light guide plate has light incidence planes and light emergence planes, and the lamp is disposed beside at least a part of the light incidence planes. Additionally, the lamp has at least one turning angle, and the turning holder covers the turning angle of the lamp. The locating block is disposed on the turning holder, and the upper frame is disposed on the lower frame and exposes the light emergence plane of the light guild plate. Particularly, the upper frame has at least one locating opening, and the locating block is embedded in the locating opening.

According to an embodiment of the present invention, the lamps of the backlight module may be L-shaped or U-shaped, furthermore, which can be a combination of an L-shaped lamp and at least one linear lamp or a combination of a U-shaped lamp and a linear lamp.

According to an embodiment of the present invention, the material of the locating block may be rubber. In another embodiment, the locating block and the turning holder can be integrally formed.

According to an embodiment of the present invention, backlight module may further comprise an optical film disposed on the upper frame and arranged above the light emergence plane of the light guide plate. The optical film may comprise at least one of a diffusion film, a brightness enhancement film and a prism film.

According to an embodiment of the present invention, the backlight module may further comprise a plurality of holders covering two ends of each lamp.

According to an embodiment of the present invention, the light guide plate further has a light diffusion plane opposite to the light emergence plane. The light diffusion plane may be a rough plane.

According to an embodiment of the present invention, the light guide plate is wedge-shaped.

The backlight of the present invention can provides three-dimensional preservation for the lamp to prevent the lamp from the damage caused by external impact. Therefore, the productive yields of the backlight can be obviously improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
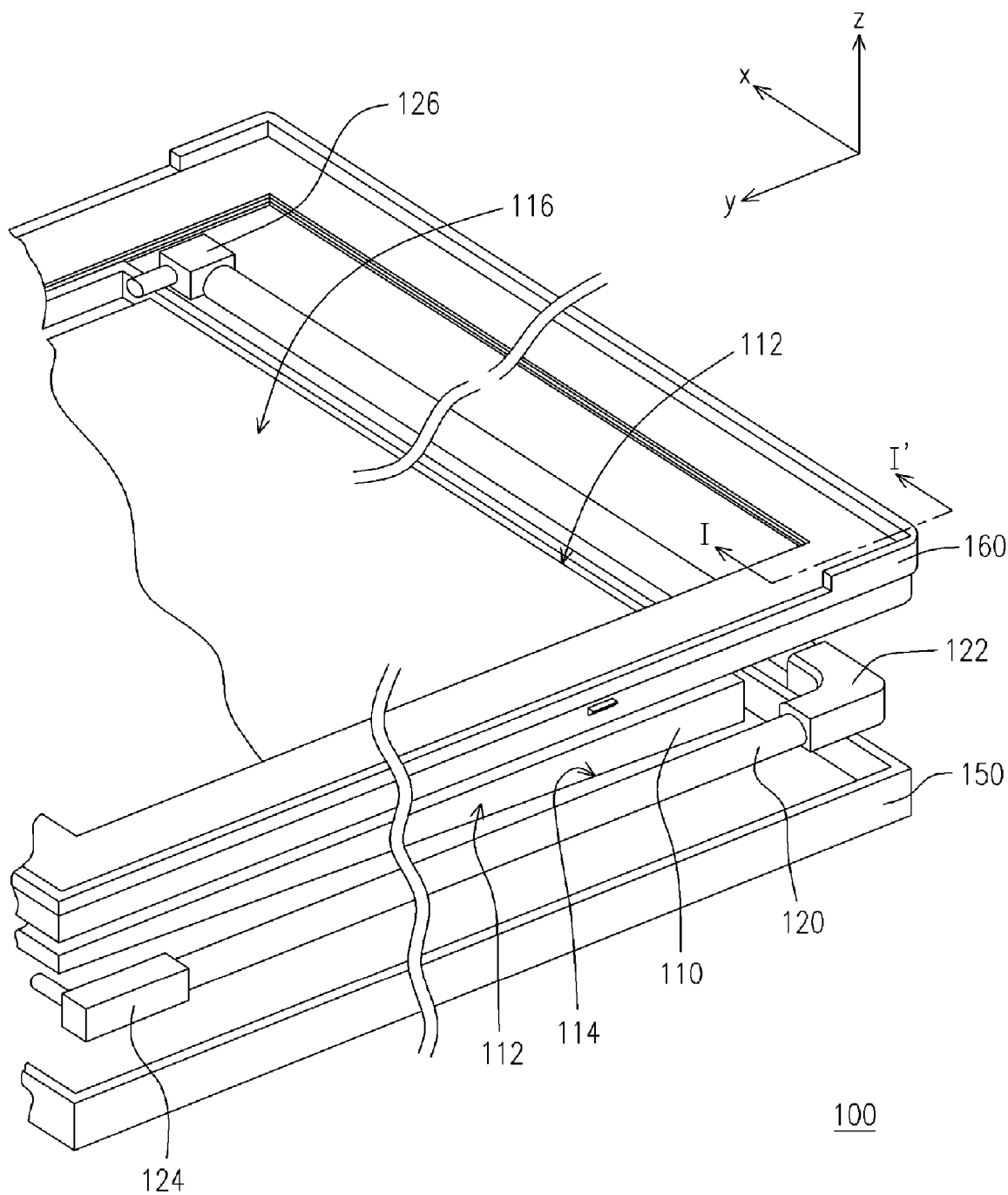
FIG. 1A is a partially perspective view illustrating a conventional backlight module.
Figure 1B:
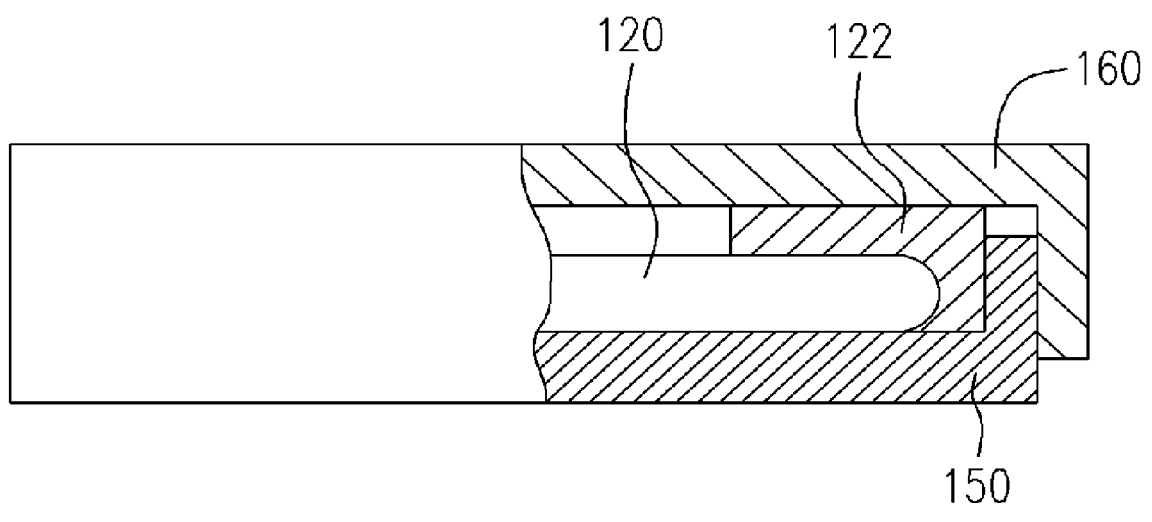
FIG. 1B schematically illustrates a sectional view of the conventional backlight module along line I-I' after assembled.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
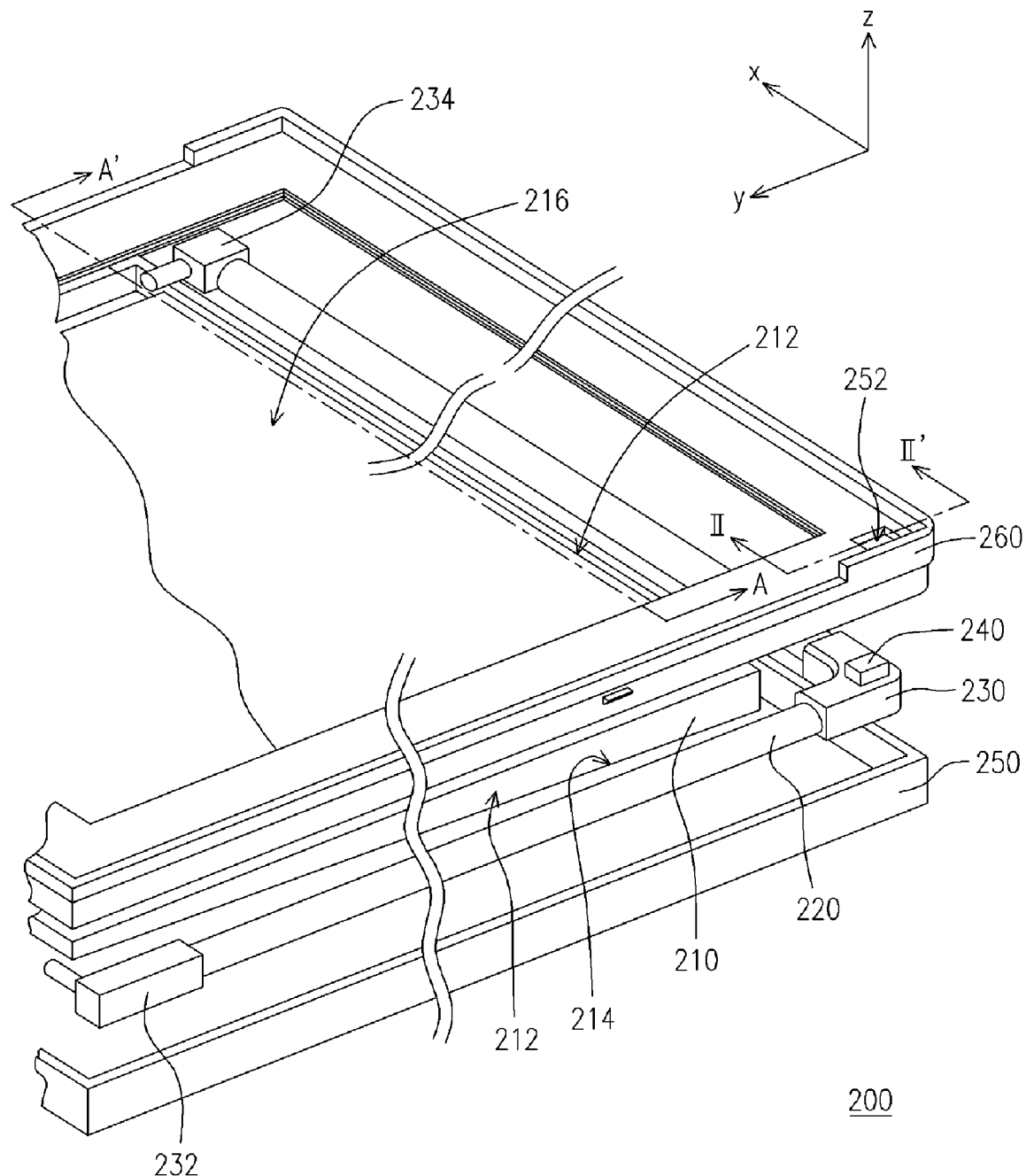
FIG. 2A is a partially perspective view illustrating a backlight module of the first embodiment of the present invention.
Figure 2B:
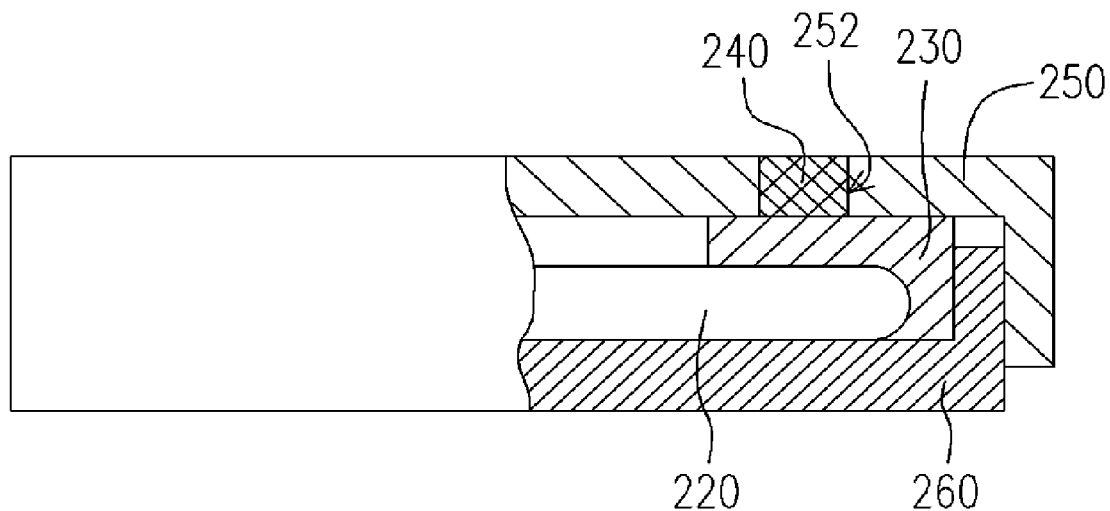
FIG. 2B schematically illustrates a sectional view of the backlight module in FIG. 2A along line II-II' after assembled.
Figure 3:
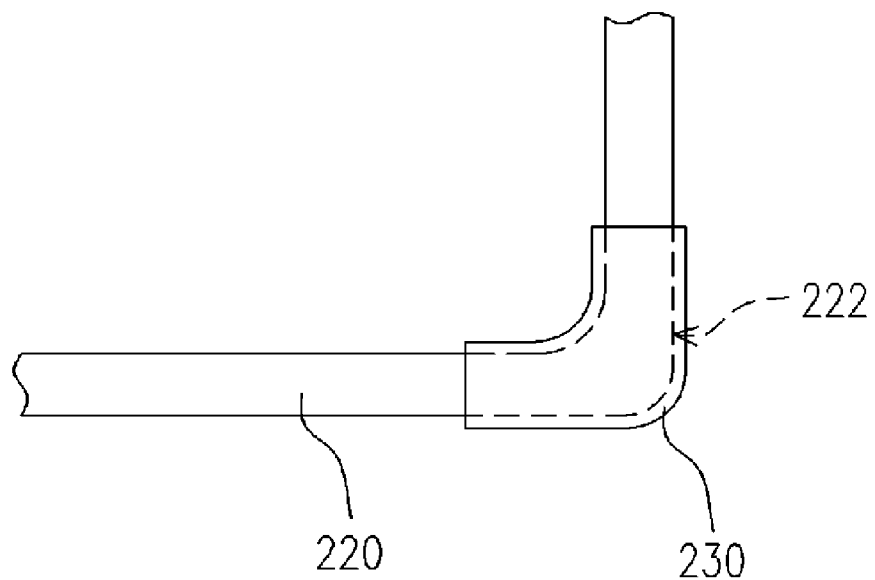
FIG. 3 is a partially top view of the lamp and the turning holder in FIG. 2A.

FIG. 2A is a partially perspective view illustrating a backlight module of the first embodiment of the present invention, and FIG. 2B schematically illustrates a sectional view of the backlight module along line II-II' after assembled. Referring to FIGS. 2A and 2B, the backlight module 200 comprises a light guide plate 210, a lamp 220, a turning holder 230, a locating block, an upper frame 240 and a lower frame 250. The light guide plate 210 and the lamp 220 are disposed on the lower frame 250. Additionally, the light guide plate 210 has light incidence planes 212 and a light emergence plane 216, wherein the light incidence planes 212 may be the side surfaces of the light guide plate 210. The lamp 220 may be an L-shaped lamp having a turning angle 222 as shown in FIG. 3 and arranged beside the light incidence planes 212 of the light guide plate 210. Then, light from the lamp 220 is incident into the light guide plate 210 via the light incidence planes 212.

The light guide plate 210 may be wedge-shaped and further have a light diffusion plane 214 opposite the light emergence plane 216. The light diffusion plane 214 may be a rough plane having a plurality of V-shaped grooves or dimples (not shown in drawings) to reflect and diffuse the light from the lamp 220. And then the light can emerge from the light emergence plane 216. Accordingly, the light guide plate 210 transforms the linear light source into a uniform planar light source for a liquid crystal panel (not shown in drawings).

Figure 4:
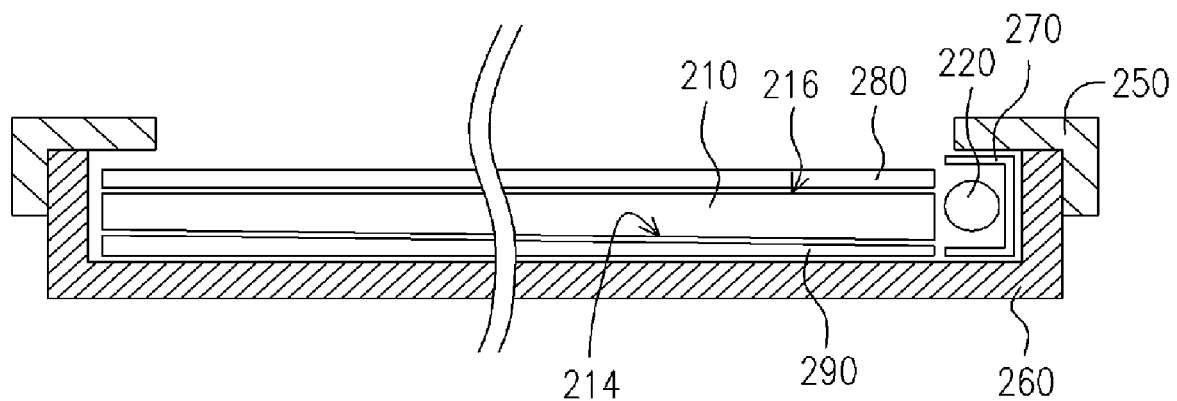
FIG. 4 schematically illustrates a sectional view of the backlight module in FIG. 2A along line A-A' after assembled.

Besides, referring to FIG. 4, an optical film 280 is disposed above the light emergence plane 216 of the light guide plate 210 to enhance the brightness of the backlight module 200. The optical film 280 may comprises at least one of a diffusion film, a brightness enhancement film and a prism film. Furthermore, a reflecting plate 290 is disposed on the bottom of the light guide plate 210 to improve the effect of reflection and diffusion of the light diffusion plane 214. And the light utilization rate of the backlight module 200 is increased.

Referring to FIG. 4, the lamp 220 is generally covered by a reflector 270 so that the light emitted from the lamp 220 can be condensed and incident to the light incidence plane 212 of the light guide plate 210. By the arrangement of the reflector 270, the optical film 280 and the reflecting plate 290, the backlight module 200 can provide a superior planar light source to satisfy the requirement of the brightness in a high resolution liquid crystal display.

Referring to FIGS. 2A, 2B and 3, the turning holder 230 covers the turning angle 222 of the lamp 220 to prevent the damage caused by external impact. Additionally, holders 232 and 234 are used to cover two ends of the lamp 220 respectively and fix the lamp 220.

Particularly, the locating block 240 is disposed on the turning holder 230. The upper frame 260 is disposed on the lower frame 250 and exposes the light emergence plane 216 of the light guide plate 210. The upper frame 260 has a locating opening 252, and the locating block 240 is embedded in the locating opening 252. Therefore, the turning holder 230 can be steadily fixed on the turning angle 222 of the lamp 220. Therefore, external impact or loading on the lamp 220 due to the turning holder 230 shifts and exposes the turning angle 222 as moving the backlight module 200 can therefore be prevented.

The locating block 240 and the turning holder 230 of the present invention may be integrally formed. Certainly, the locating block 240 and the turning holder 230 can be formed of different material and then assembled to each other. There is no set limit on the assembling manner of the locating block 240 and the turning holder 230. It is within the scope of the present invention according to the practical necessary.

It should be noted that the locating block 240 can further be made of rubber or other buffering materials to diminish the external impact on the lamp 220 along z-axis. Specifically, the locating block 240 can absorb the impact caused by the weight of the liquid crystal panel and preserve the lamp 220 from the damage.

According to the above paragraph, the locating block 240 is fixed on the turning holder 230 and embedded in the locating opening 252 of the upper frame 260. Thus, the position of the turning holder 230 on the x-y plane can be located so that the turning angle 222 of the lamp 220 can be exactly covered by the turning holder 230. The turning angle 222 of the lamp 220 is preserved from the impact and loading on the x-y plane. Additionally, the locating block 240 can further absorb the loading produced by the external force along z-axis. In other words, the present invention provides three-dimensional preservation for the lamp. The damage of the lamp 220 as moving the backlight module 200 can be reduced, and the productive yields of the backlight module 200 will be improved.

Figure 5:
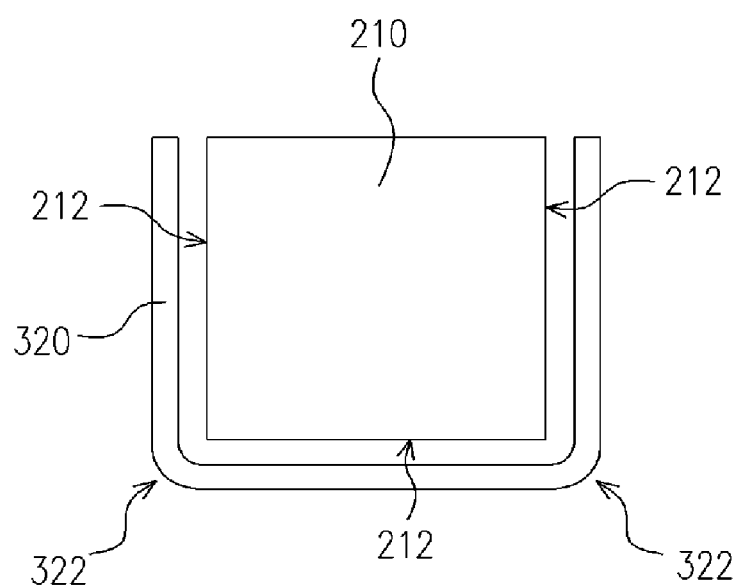
FIG. 5 schematically illustrates the arrangement of a lamp and a light guide plate according the second embodiment of the present invention.

FIG. 5 schematically illustrates the arrangement of a lamp and a light guide plate according the second embodiment of the present invention. Although the aforementioned embodiment take the L-shaped lamp for an example to illustrate the backlight module of the present invention, but one of ordinary skill in the art may adopt a U-shaped lamp 320 as shown in FIG. 5 to replace the aforementioned L-shaped lamp. Referring to FIG. 5, to use the U-shaped lamp 320 as a light source, the light guide plate 210 may have three light incidence planes 212, and the U-shaped lamp 320 is the arrangement corresponding to the three light incidence planes 212.

To simplify the following discussion, FIG. 5 shows only the light guide plate 210 and U-shaped lamp 320, but one of ordinary skill in the art can infer that the backlight module of the embodiment should include two turning holders to cover the two corresponding turning angles 322 of the U-shaped lamp 320. Certainly, locating blocks embedded in the corresponding locating openings of the upper frame is disposed on the turning holders to locate the same. Thus, the turning angles 322 can be exactly covered by the turning holders, and the damage caused by external force is prevented.

Besides, such as the locating block 240 of the first embodiment shown in FIG. 2A, the locating blocks can also provide the impact absorbing effect to preserve the U-shaped lamp 320 from the impact or loading caused by the liquid crystal panel or other devices (not shown in drawings) disposed above the backlight module.

Figure 6A:
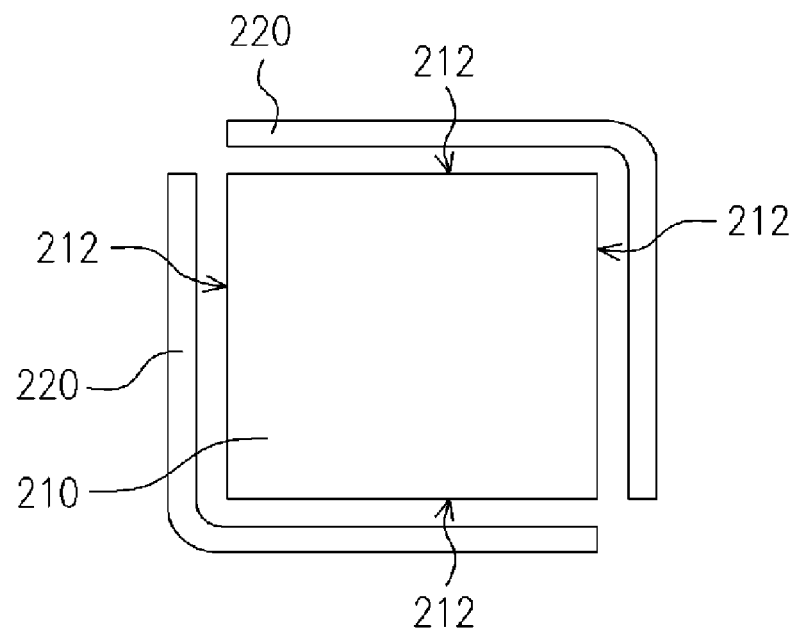
FIGS. 6A to 6D schematically illustrate the arrangement of a lamp and a light guide plate according other embodiments of the present invention.
Figure 6B:
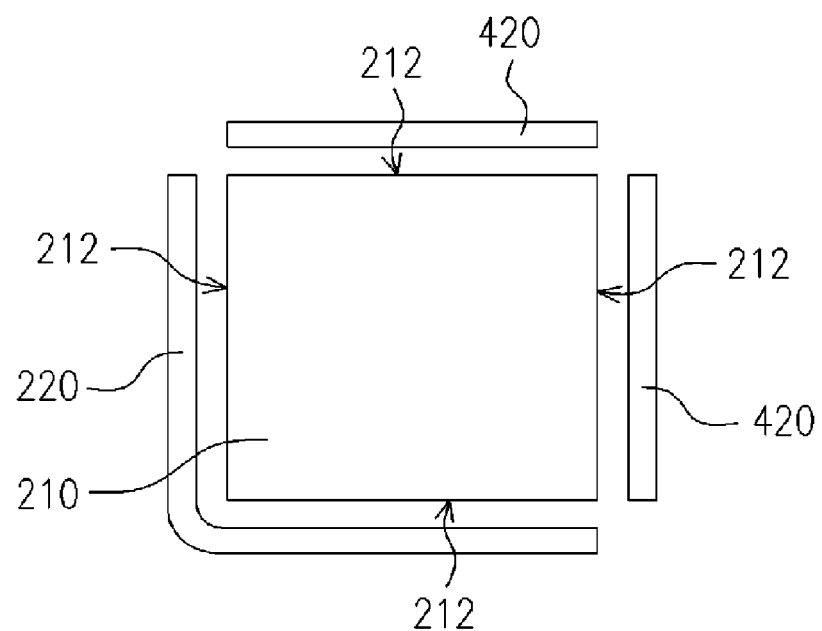
Figure 6C:
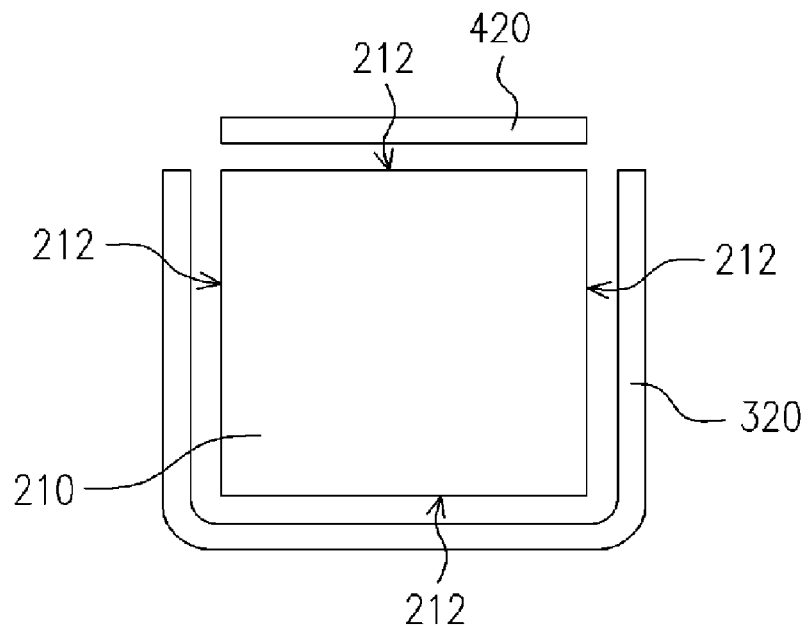
Figure 6D:
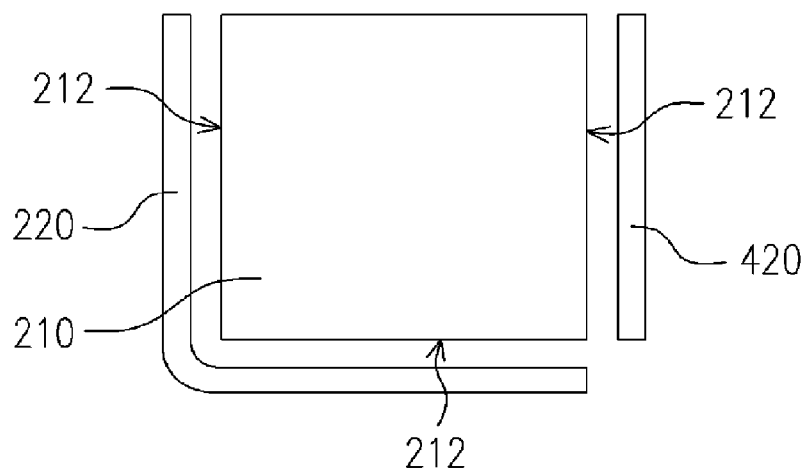

FIGS. 6A to 6D schematically illustrate the arrangement of a lamp and a light guide plate according other embodiments of the present invention. Referring to FIGS. 6A to 6D, except the one of single lamp type, the backlight module of the present invention may include multiple lamps, such as the combination of two L-shaped lamps 220, the combination of one or two linear lamps 420 and one L-shaped lamp 220, or the combination of one linear lamp 420 and one U-shaped lamp 320. As shown in FIGS. 6A to 6C, the light guide plate 210 has four light incidence planes 212 corresponding to the lamps in the combination of two L-shaped lamps 220, the combination of two linear lamps 420 and one L-shaped lamp 220, or the combination of one linear lamp 420 and one U-shaped lamp 320. As shown in FIG. 6D, the light guide plate 210 has three light incidence planes 212 corresponding to the lamps in the combination of one linear lamp 420 and one L-shaped lamp 220.

Similarly, the backlight module in the aforementioned embodiment includes turning holders to cover the turning angles of the lamps. Locating blocks are also disposed on the turning holders and embedded in the locating openings of the upper frame to locate the turning holders on appropriate positions. Thus, the turning holders can preserve the turning angles of the lamps from external impact, and the locating blocks can also provides the impact absorbing effect.

Accordingly, the backlight module of the present invention applies turning holders both in the single lamp type or multiple lamps type. Each turning holders has a locating block and is located with the upper frame by the locating block to preserve the turning angle of each lamp from external impact.

In summary, the backlight module of the present invention has a superior locating effect of the turning holder by the collocation of the locating block and the locating opening. The turning holder can exactly cover the turning angle of the lamp and preserve the lamp from the damage caused by external impact. Furthermore, the locating block of the present invention can buffer the impact or loading caused by the liquid crystal panel or other devices disposed above the backlight module. In other words, the backlight module provides three-dimensional preservation for the lamp to prevent the lamp from the damage caused by external impact. Therefore, the present invention can improve the productive yields of the backlight module.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module, comprising:
    a light guild plate having a plurality of light incidence planes and a plurality of light emergence planes;
    at least one lamp disposed beside at least a part of the light incidence planes of the light guild plate, wherein light from the lamp is incident into the light guide plate and then emerges from the light emergence plane, the lamp having at least one turning angle;
    a lower frame suitable for carrying the light guild plate and the lamp;
    at least one turning holder covering the turning angle of the lamp;
    a locating block disposed on the turning holder; and
    an upper frame disposed on the lower frame and exposing the light emergence plane of the light guild plate, wherein the upper frame has at least one locating opening, in which the locating block is embedded.

2. The backlight module according to claim 1, wherein the lamp is L-shaped.

3. The backlight module according to claim 2, further comprising at least one linear lamp disposed beside one of the light incidence planes of the light guild plate.

4. The backlight module according to claim 1, wherein the lamp is U-shaped.

5. The backlight module according to claim 4, further comprising a linear lamp disposed beside one of the light incidence planes of the light guild plate.

6. The backlight module according to claim 1, wherein the material of the locating block comprises rubber.

7. The backlight module according to claim 1, wherein the locating block and the turning holder are integrally formed.

8. The backlight module according to claim 1, further comprising an optical film disposed on the upper frame and arranged above the light emergence plane of the light guide plate.

9. The backlight module according to claim 8, wherein the optical film comprises at least one of a diffusion film, a brightness enhancement film and a prism film.

10. The backlight module according to claim 1, further comprising a plurality of holders covering two ends of the lamp.

11. The backlight module according to claim 1, wherein the light guide plate further has a light diffusion plane opposite to the light emergence plane.

12. The backlight module according to claim 11, wherein the light diffusion plane is a rough plane.

13. The backlight module according to claim 1, wherein the light guide plate is wedge-shaped.

* * * * *